(12) United States Patent
Sundaram et al.

(10) Patent No.: US 11,195,514 B2
(45) Date of Patent: Dec. 7, 2021

(54) SYSTEM AND METHOD FOR A MULTICLASS APPROACH FOR CONFIDENCE MODELING IN AUTOMATIC SPEECH RECOGNITION SYSTEMS

(71) Applicant: Genesys Telecommunications Laboratories, Inc., Daly City, CA (US)

(72) Inventors: Ramasubramanian Sundaram, Hyderabad (IN); Aravind Ganapathiraju, Hyderabad (IN); Yingyi Tan, Carmel, IN (US)

(*) Notice: Subject to any disclaimer, the term of this patent is extended or adjusted under 35 U.S.C. 154(b) by 104 days.

(21) Appl. No.: 16/414,885

(22) Filed: May 17, 2019

(65) Prior Publication Data

US 2019/0355348 A1 Nov. 21, 2019

Related U.S. Application Data

(60) Provisional application No. 62/673,505, filed on May 18, 2018.

(51) Int. Cl.

| | |
|---|---|
| *G10L 15/00* | (2013.01) |
| *G10L 15/10* | (2006.01) |
| *G10L 15/06* | (2013.01) |
| *G06N 20/00* | (2019.01) |
| *G10L 15/26* | (2006.01) |
| *G10L 15/14* | (2006.01) |

(52) U.S. Cl.
CPC ............ *G10L 15/063* (2013.01); *G06N 20/00* (2019.01); *G10L 15/14* (2013.01); *G10L 15/26* (2013.01)

(58) Field of Classification Search
CPC ......... G10L 15/00; G10L 15/01; G10L 15/08; G10L 15/10; G10L 15/26
See application file for complete search history.

(56) References Cited

U.S. PATENT DOCUMENTS

| 6,539,353 B1* | 3/2003 | Jiang ..................... G10L 15/142 |
| | | 704/252 |
| 7,212,968 B1* | 5/2007 | Garner ................ G06F 16/3343 |
| | | 704/251 |
| 7,310,600 B1* | 12/2007 | Garner .................... G10L 15/12 |
| | | 704/234 |

(Continued)

OTHER PUBLICATIONS

International Search Report and Written Opinion of the International Searching Authority dated Sep. 18, 2019 in related PCT application PCT/US2019/032782, International Filing Date May 17, 2019, 17 pages.

*Primary Examiner* — Shreyans A Patel

(57) ABSTRACT

A system and method are presented for a multiclass approach for confidence modeling in automatic speech recognition systems. A confidence model may be trained offline using supervised learning. A decoding module is utilized within the system that generates features for audio files in audio data. The features are used to generate a hypothesized segment of speech which is compared to a known segment of speech using edit distances. Comparisons are labeled from one of a plurality of output classes. The labels correspond to the degree to which speech is converted to text correctly or not. The trained confidence models can be applied in a variety of systems, including interactive voice response systems, keyword spotters, and open-ended dialog systems.

13 Claims, 5 Drawing Sheets

(56) References Cited

U.S. PATENT DOCUMENTS

| | | | |
|---|---|---|---|
| 7,657,433 B1 * | 2/2010 | Chang | G10L 15/08 |
| | | | 704/252 |
| 8,515,736 B1 * | 8/2013 | Duta | H04M 3/5232 |
| | | | 704/9 |
| 2004/0181408 A1 * | 9/2004 | Acero | G10L 15/144 |
| | | | 704/255 |
| 2004/0230424 A1 * | 11/2004 | Gunawardana | G10L 15/07 |
| | | | 704/219 |
| 2006/0206332 A1 * | 9/2006 | Paek | G10L 13/00 |
| | | | 704/257 |
| 2007/0233488 A1 * | 10/2007 | Carus | G10L 15/183 |
| | | | 704/257 |
| 2008/0027893 A1 * | 1/2008 | Cavestro | G06F 16/313 |
| 2015/0307111 A1 * | 10/2015 | Juzswik | H04N 21/42203 |
| | | | 701/2 |
| 2017/0206891 A1 * | 7/2017 | Lev-Tov | G06N 20/00 |

* cited by examiner

| | Norm Edit Distance | Edit Distance | Match | Label | Example: Ref vs Hyp |
|---|---|---|---|---|---|
| 300a | N/A | 0.0 | Yes | [1,0,0,0] | Call vs Call |
| 300b | N/A | > 0.0 and < 1.0 | No | [1,0,0,0] | Representative vs Representatives |
| 300c | < 0.1 | < 2.0 | No | [0,1,0,0] | 42775 vs 42o77So |
| 300d | > 0.1 and < 0.4 | N/A | No | [0,0,1,0] | No no no Vs nine oh nine oh |
| 300e | > 0.4 | N/A | No | [0,0,0,1] | No no no vs nine oh nine oh nine oh oh |

SYSTEM AND METHOD FOR A MULTICLASS APPROACH FOR CONFIDENCE MODELING IN AUTOMATIC SPEECH RECOGNITION SYSTEMS

CROSS REFERENCE TO RELATED APPLICATION

This application claims the benefit of U.S. Provisional Application No. 62/673,505, filed May 18, 2018, titled "SYSTEM AND METHOD FOR A MULTI-CLASS APPROACH FOR CONFIDENCE MODELING", the contents of which are incorporated herein.

BACKGROUND

The present invention generally relates to telecommunications systems and methods, as well as automatic speech recognition. More particularly, the present invention pertains to confidence modeling in decoding modules of automatic speech recognition.

SUMMARY

A system and method are presented for a multiclass approach for confidence modeling in automatic speech recognition systems. A confidence model may be trained offline using supervised learning. A decoding module is utilized within the system that generates features for audio files in audio data. The features are used to generate a hypothesized segment of speech which is compared to a known segment of speech using edit distances. Comparisons are labeled from one of a plurality of output classes. The labels correspond to the degree to which speech is converted to text correctly or not. The trained confidence models can be applied in a variety of systems, including interactive voice response systems, keyword spotters, and open-ended dialog systems.

In one embodiment, a method is provided for training a confidence model in an automatic speech recognition system to obtain probability of an output hypothesis being correct, comprising the steps of: providing training examples of audio data, wherein the training examples comprise features and labels that are associated with the features; generating features for training by a decoding module for each audio file in the audio data, wherein the decoding module comprises the confidence model in the automatic speech recognition system; evaluating the features generated by comparing a hypothesized segment of speech to a known segment of speech; and labeling comparisons of hypothesized segments to reference segments from one of a plurality of output classes.

Comparing comprises examining edit distance and normalized edit distance as a metric to determine class label. The normalized edit distance is obtained by dividing the edit distance value by the length of the string.

The labels comprise one of a plurality of labels corresponding to the degree to which speech is converted to text correctly or not. The labels comprise multiclass classifiers corresponding to whether speech is converted to text correctly or not.

The training of the confidence model is performed offline using supervised learning. The plurality of output classes is four.

In another embodiment, a method for converting input speech to text using confidence modelling with a multiclass approach is provided, the method comprising the steps of: accepting input speech into the automatic speech recognition system; converting the input speech into a set of features by the frontend module using a speech feature extraction method; accepting the features by the decoding module and determining the best hypotheses of the output text using the acoustic model; and applying the trained confidence model to the decoding module to obtain a probability using a multiclass classifier to predict class output text being correct.

Speech feature extraction comprises Mel-frequency Cepstrum Coefficients.

The confidence model is trained by: providing training examples of audio data, wherein the training examples comprise features and labels that are associated with the features; generating features for training by a decoding module for each audio file in the audio data, wherein the decoding module comprises the confidence model in the automatic speech recognition system; evaluating the features generated by comparing a hypothesized segment of speech to a known segment of speech; and labeling comparisons of hypothesized segments to reference segments from one of a plurality of output classes.

A system is provided for converting input speech to text in an automatic speech recognition system using confidence modelling with a multiclass approach, the system comprising: a frontend feature module operatively coupled to a decoding module, wherein the frontend feature module is capable of accepting input speech into the automatic speech recognition system and generating features from the input speech; the decoding module, which accepts the generated features from the frontend feature module; a trained confidence model operatively coupled to the decoding module and to which the decoding module sends the features for each hypotheses segment to obtain a probability using a multiclass classifier; an acoustic model operative coupled to the decoding module, wherein the acoustic model is used by the decoding module to determine output text hypotheses; and output text hypotheses with associated probabilities for return to a calling application.

BRIEF DESCRIPTION OF THE DRAWINGS

FIG. 3 is a table illustrating results based on a multiclass approach.

DETAILED DESCRIPTION

Figure 1:
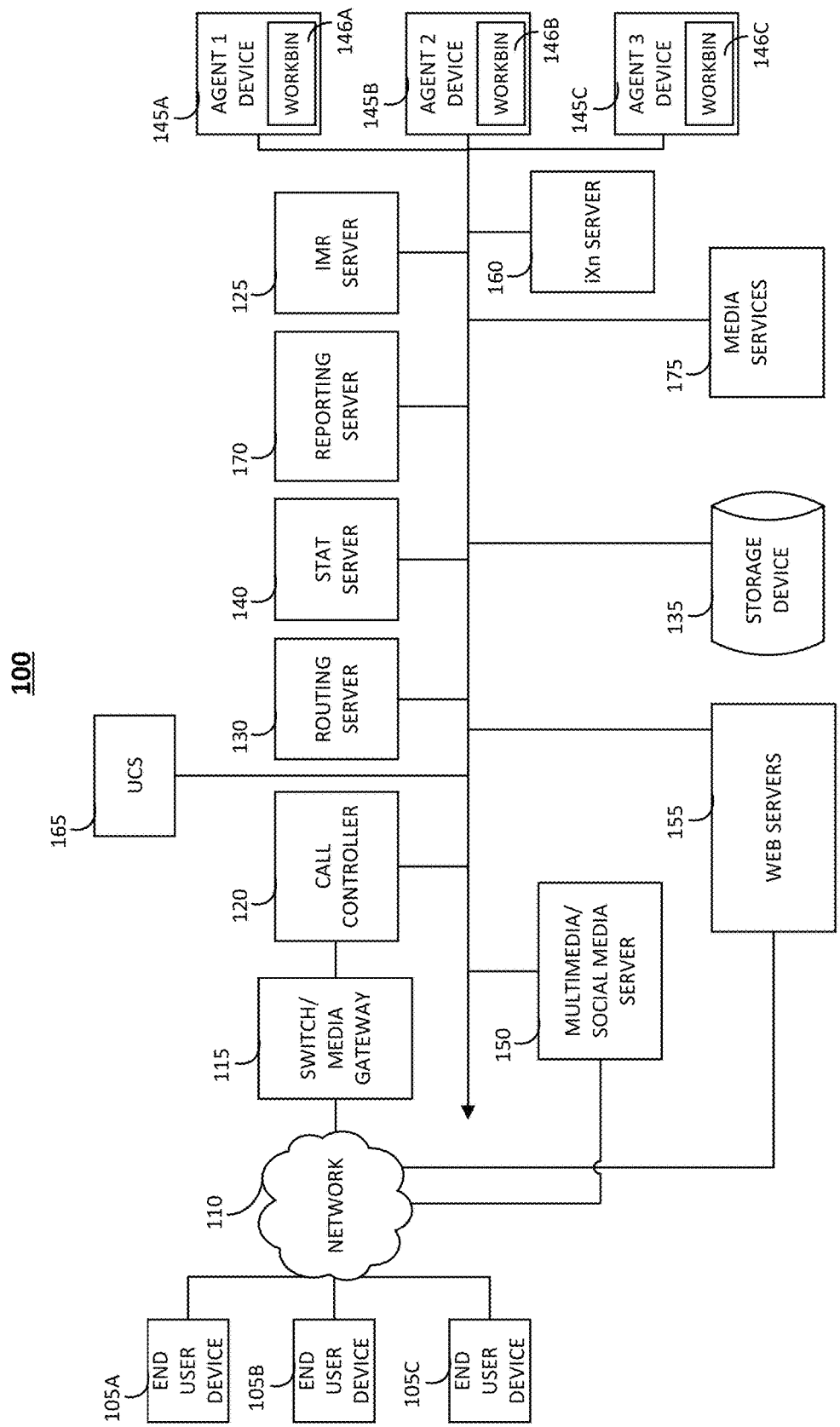
FIG. 1 is a diagram illustrating an embodiment of a communication infrastructure.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In automatic speech recognition (ASR) systems, confidence models are trained offline using supervised learning to determine probabilities of output hypotheses being correct. In order to train a supervised classifier, training examples are provided where the features and the labels associated with the features need to be provided. The training examples may be obtained from real customer data and other in-house sources of data. From the audio data, input data (features) needed to train the confidence model are generated from the decoder for each audio file. The labels are nothing but binary (0 or 1) labels corresponding to whether the speech is converted to text correctly or not. If the hypothesis matches the known ground truth, then the label is zero. If the hypothesis does not match the known ground truth, then the label is one. Sample training data may be, for example, Feat11, feat12, . . . , feat1N (Features) with a segment hypothesis of "hello world". The segment ground truth might be "hello world" and the corresponding label "0". In another example, sample training data may be Feat21, feat22, . . . , feat2N (Features) with a segment hypothesis of "call my". The segment ground truth might be "call me" and the corresponding label "1".

Typically, a binary classifier is trained using a Gaussian Mixture Model approach where two mixtures are trained: one each for correct and incorrect hypotheses. At runtime, the input feature may be evaluated against both Gaussians and the highest scoring one is chosen. With the advent of Deep Neural Networks, a binary classifier (with two output nodes) with DNN's are trained on certain input features to obtain a classifier score. In either case, the classifier is a binary classifier which means if the segment hypothesis is not the same as the segment ground truth, the label is one. Using Deep Neural Networks has the advantage that it can help capture the non-linear relationships present in the input data and has shown to give better performance in recent times.

The problem with a binary approach is that the label will be one if the hypothesis does not match the ground truth. Even if the segment hypothesis differs by one letter from the ground truth, the label will be one. Thus, for the following example, Feat11, feat12, . . . , feat1N (Features) with a segment hypothesis of "Representatives", the segment ground truth being "Representative", the corresponding label is "1". Similarly, sample training data may be Feat21, feat22, . . . , feat2N (Features) with a segment hypothesis of "call me later", the segment ground truth being "Representative", then the corresponding label is also "1". The hypothesis in the first example is very close to the ground truth (representatives vs. representative) while the second example is completely incorrect (call me later vs representative). However, both have the label "1" which means the classifier will treat both as equal error and will try to learn them. They are not equal in error. It is acceptable to the system hypothesizing "representative" as "representatives" and can be considered a lesser error than hypothesizing "representative" as "call me later". Treating them as equal error can have an adverse effect on classifier performance. Hence, instead of using a binary classifier, a multiclass classifier is proposed that has multiple output labels.

DNNs comprise an input layer, a plurality of hidden layers, and an output layer. A set of 12 features were used, comprising 12 nodes. The output layer comprised 4 nodes. The number of features chosen was based on experimentation on various test inputs. The hidden layers comprised 64 nodes each. Performance was evaluated by determining precision and recall. The multiclass approach was determined to handle real world scenarios better than binary labels with better accuracy.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication. This information is often displayed to the agent through a User Interface. In this regard, each agent device 145 may include a telephone adapted for regular telephone calls, VoIP calls, etc. The agent device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

Multiclass Confidence Modeling

Figure 2:
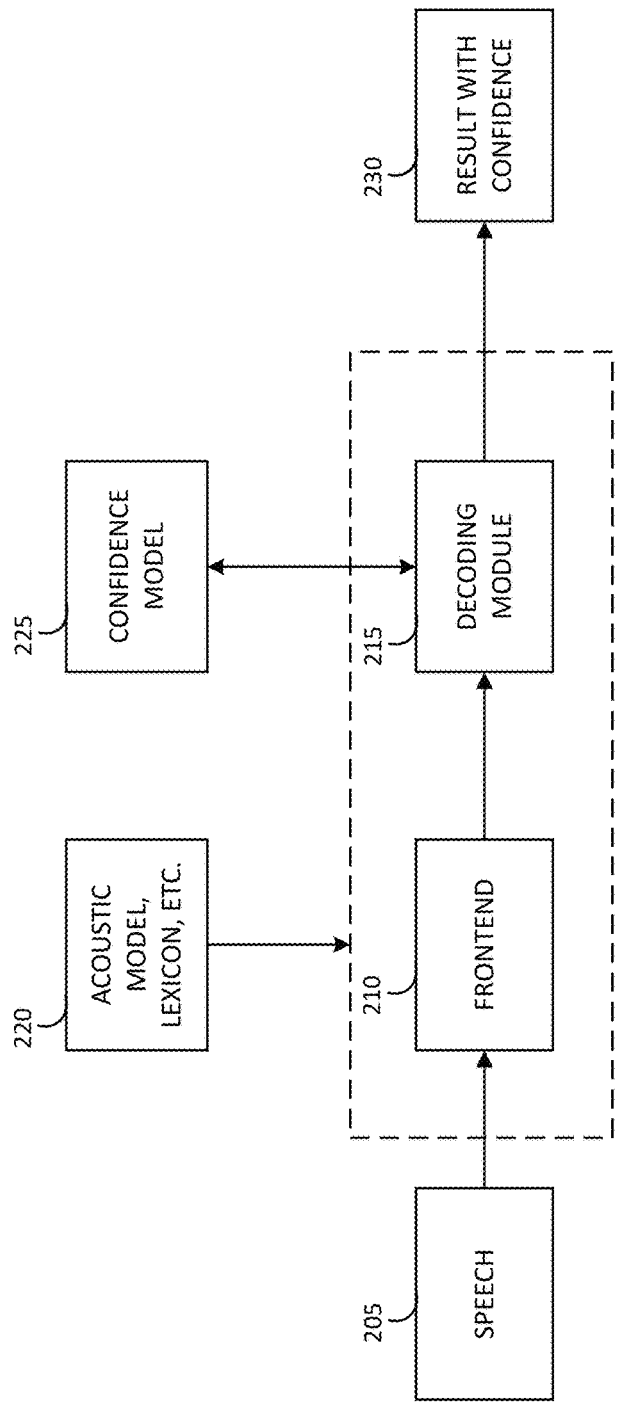
FIG. 2 is a diagram illustrating an embodiment of an automatic speech recognition system.

FIG. 2 is a diagram illustrating an embodiment of an automatic speech recognition system, indicated generally at 200. The ASR system may be part of the media services 175 of the contact center system 100. Components of the ASR system indicated generally at 200 include: input speech 205, frontend 210, decoding module 215, acoustic model/lexicon 220, confidence model 225, and results 230.

In an ASR system, the user's speech is converted to text and returned to the application (e.g., IVR system, spoken dialog system, keyword spotting system, etc.) Input speech 205 is converted to a set of features by the frontend 210. For example, in an IVR system, the input speech may comprise the user's voice as they interact with the IVR system. The frontend 210 comprises a feature module which accepts the input speech 205 into the automatic speech recognition system 200 and generates features from the input speech. The conversion of speech to text may be performed through extracting Mel-frequency Cepstrum Coefficients (MFCC) features by converting audio time signal to its frequency components and further processing using methods known in the art.

The decoding module 215 accepts these features and uses the acoustic model 220 to determine the best hypothesis through converting the features to text. For every hypothesis segment, a set of features (e.g. floating-point numbers) are sent to the confidence model 225 by the decoding module 215. The confidence model 225 provides a probability of the hypotheses (e.g., text output) being correct to the decoding module 215. The probability comprises a floating-point number that informs the decoding module how likely that the hypothesis is correct (e.g., how confident the system is with its text output). Typically, a value between 0.0-1.0 is output along with the output text 230. A lower value may imply that the system is not very confident in its final output. Output text hypotheses, along with the probability, are returned as results 230 to the calling application by the decoding module 215.

In an embodiment, the confidence model 225 may be a module in the decoding module 215.

In an embodiment, the primary use of confidence modeling is for Interactive Voice Response (IVR). IVR applications use the confidence value to drive the overall dialog by confirming the user input if needed. In another embodiment, confidence modeling may be used in call analyzing (e.g., keyword spotting). In another embodiment, confidence modeling may also be used in open ended dialog systems.

In an IVR system, for example, the user calls in for a specific task to be completed. The system guides the user in task completion. The user's speech is decoded and converted to text for further action to be taken. Along with the text output converted from speech, the system also returns a confidence value (or probability) which helps in guiding the dialogue. In a first example, user speech may be decoded into the text "one two three four". The system may determine a decoded text confidence of 0.5. The system prompt is "Did you mean one two three four". In a second example, user speech may be decoded into the text "one two three four". The system may determine a decoded text confidence of 0.25. The system prompt is "Sorry, I did not understand that. Please tell me the number again".

As can be seen in the two examples, based on the confidence value, the system responds to the user differently and helps guide towards task completion. It can ask the user for confirmation or ask them to repeat. The worst-case scenario is when the decoded text confidence is high but that is not what the user actually said. The system may thus assume that the decoded speech is correct and proceed further while in fact it is wrong. The top-level application uses the confidence value to guide the system towards task completion.

In a binary classifier, choosing the output labels is rather straight forward. As discussed above, if the hypothesis matches the ground truth the label is zero. If the hypothesis does not match the ground truth, the label is one. With a multiclass classifier, multiple classes are created depending on how correct or incorrect the hypothesis is. In an embodiment, the reference is compared with the hypothesis and four output classes are proposed. Class labels may be determined using edit distances and normalized edit distance as metrics to decide on class labels. Edit distance is a way of quantifying how dissimilar two strings (e.g., words) are to one another by counting the minimum number of operations required to transform one string into the other. In an embodiment, the normalized edit distance is obtained by obtaining the edit distance value and dividing it by the length of the string.

FIG. 3 is a table illustrating results based on a multiclass approach, indicated generally at 300. The table 300 illustrates examples of data for samples with "Normalized Edit Distance", "Edit Distance", "Match", "Label", and "Example: Ref vs. Hyp". Closely matching results and hypotheses are grouped together with those that are exact matches. For example, 300a has an exact match of "call" vs. "call" while 300b illustrates a match differing by just one phone ("representative" vs. "representatives"). Examples 300c, 300d, and 300e are progressively worse in terms of closeness of the reference verse the hypothesis. The label of each example reflects the groupings. 300a and 300b have labels of [1,0,0,0], which is representative of the multiclass label. 300c is labeled [0,1,0,0]. Further differentiating, 300d is labeled [0,0,1,0] and finally, 300e is [0,0,0,1], indicating the least likely match.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 4A, 4B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 4A:
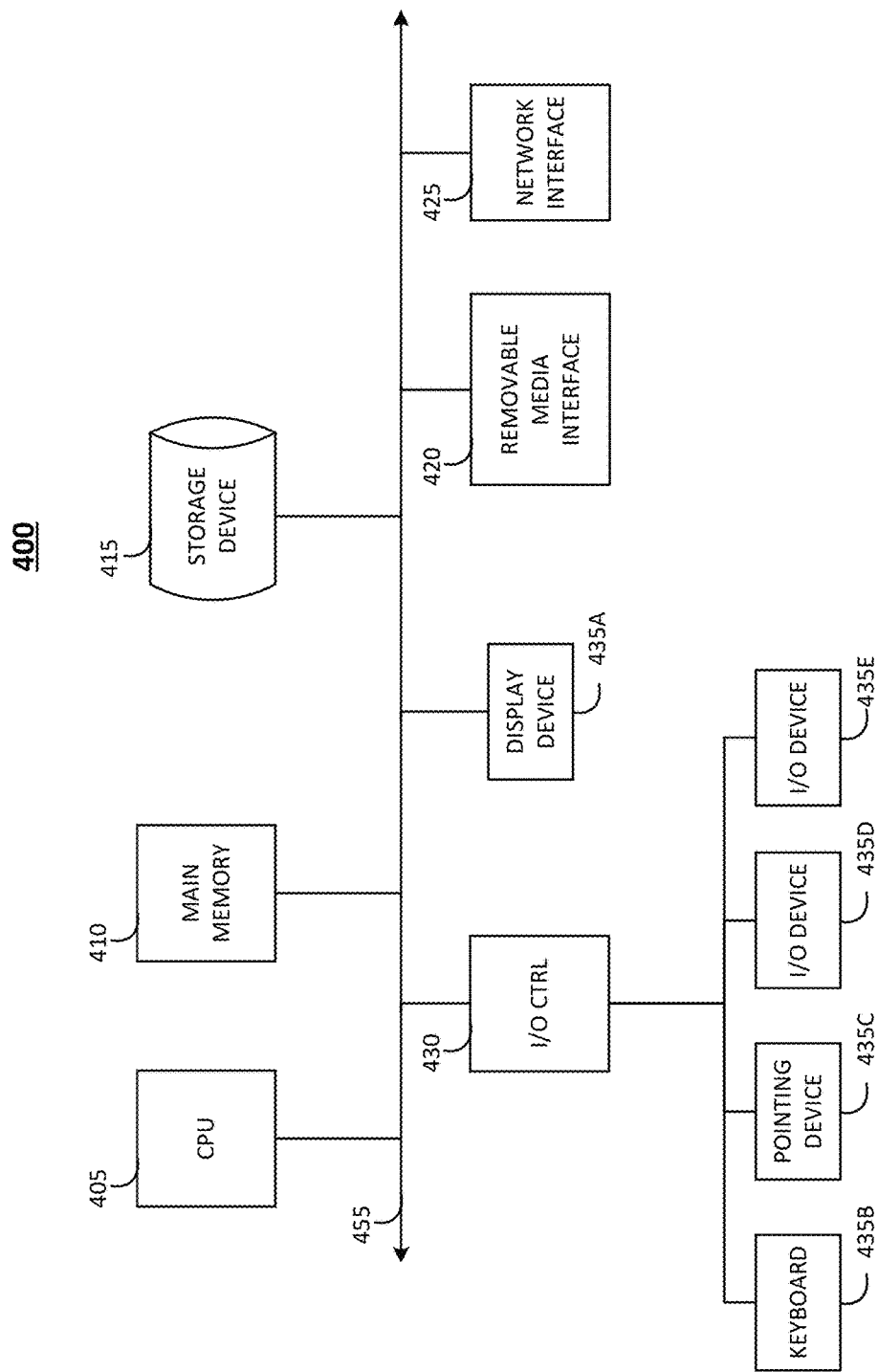
FIG. 4A is a diagram illustrating an embodiment of a computing device.
Figure 4B:
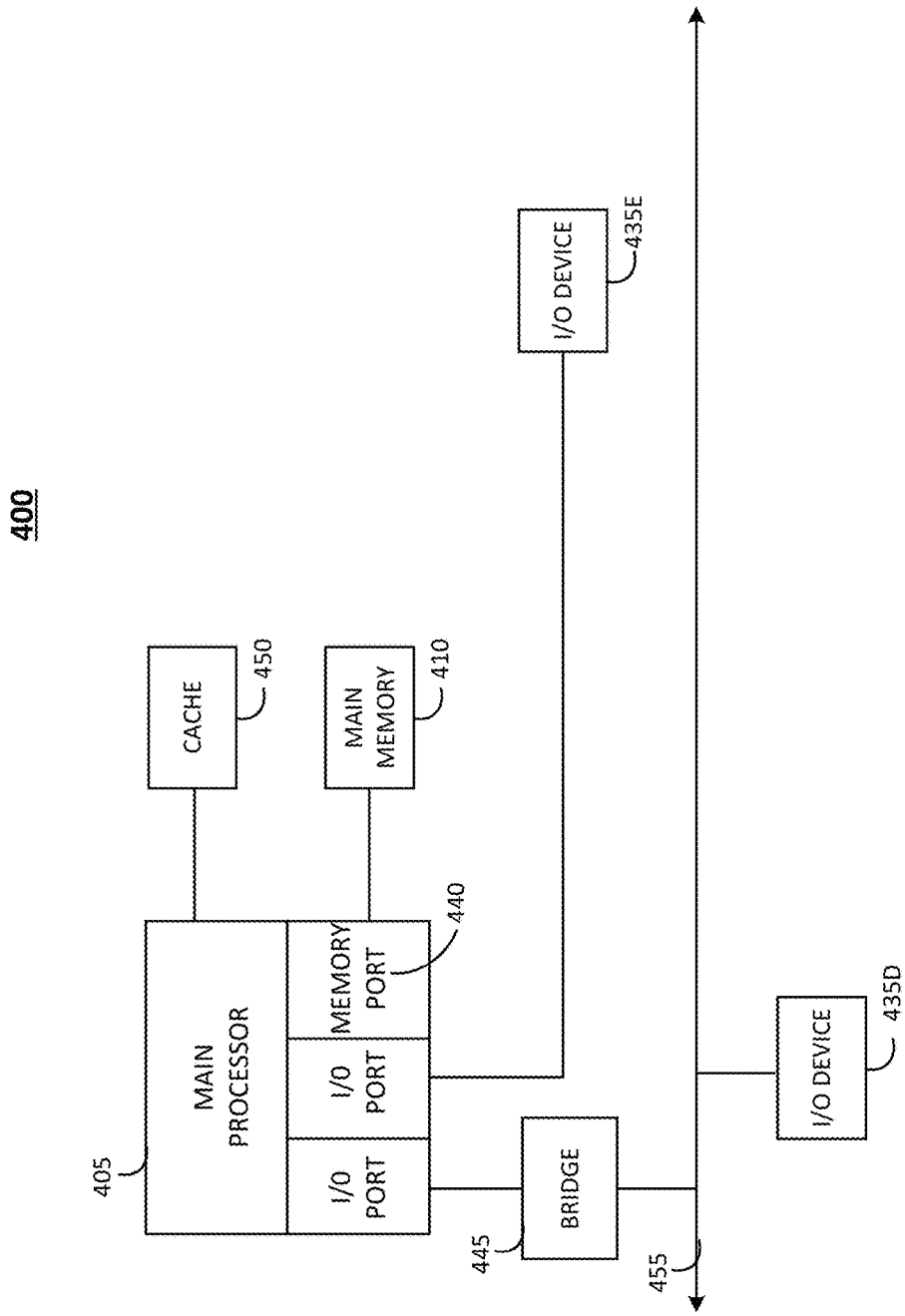
FIG. 4B is a diagram illustrating an embodiment of a computing device.

FIGS. 4A and 4B are diagrams illustrating an embodiment of a computing device as may be employed in an embodiment of the invention, indicated generally at 400. Each computing device 400 includes a CPU 405 and a main memory unit 410. As illustrated in FIG. 4A, the computing device 400 may also include a storage device 415, a removable media interface 420, a network interface 425, an input/output (I/O) controller 430, one or more display devices 435A, a keyboard 435B and a pointing device 435C (e.g., a mouse). The storage device 415 may include, without limitation, storage for an operating system and software. As shown in FIG. 4B, each computing device 400 may also include additional optional elements, such as a memory port 440, a bridge 445, one or more additional input/output devices 435D, 435E, and a cache memory 450 in communication with the CPU 405. The input/output devices 435A, 435B, 435C, 435D, and 435E may collectively be referred to herein as 435.

The CPU 405 is any logic circuitry that responds to and processes instructions fetched from the main memory unit 410. It may be implemented, for example, in an integrated circuit, in the form of a microprocessor, microcontroller, or graphics processing unit, or in a field-programmable gate array (FPGA) or application-specific integrated circuit (ASIC). The main memory unit 410 may be one or more memory chips capable of storing data and allowing any storage location to be directly accessed by the central processing unit 405. As shown in FIG. 4A, the central processing unit 405 communicates with the main memory 410 via a system bus 455. As shown in FIG. 4B, the central processing unit 405 may also communicate directly with the main memory 410 via a memory port 440.

In an embodiment, the CPU 405 may include a plurality of processors and may provide functionality for simultaneous execution of instructions or for simultaneous execution of one instruction on more than one piece of data. In an embodiment, the computing device 400 may include a parallel processor with one or more cores. In an embodiment, the computing device 400 comprises a shared memory parallel device, with multiple processors and/or multiple processor cores, accessing all available memory as a single global address space. In another embodiment, the computing device 400 is a distributed memory parallel device with multiple processors each accessing local memory only. The computing device 400 may have both some memory which is shared and some which may only be accessed by particular processors or subsets of processors. The CPU 405 may include a multicore microprocessor, which combines two or more independent processors into a single package, e.g., into a single integrated circuit (IC). For example, the computing device 400 may include at least one CPU 405 and at least one graphics processing unit.

In an embodiment, a CPU 405 provides single instruction multiple data (SIMD) functionality, e.g., execution of a single instruction simultaneously on multiple pieces of data. In another embodiment, several processors in the CPU 405 may provide functionality for execution of multiple instructions simultaneously on multiple pieces of data (MIMD). The CPU 405 may also use any combination of SIMD and MIMD cores in a single device.

FIG. 4B depicts an embodiment in which the CPU 405 communicates directly with cache memory 450 via a secondary bus, sometimes referred to as a backside bus. In other embodiments, the CPU 405 communicates with the cache memory 450 using the system bus 455. The cache memory 450 typically has a faster response time than main memory 410. As illustrated in FIG. 4A, the CPU 405 communicates with various I/O devices 435 via the local system bus 455. Various buses may be used as the local system bus 455, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 435A, the CPU 405 may communicate with the display device 435A through an Advanced Graphics Port (AGP). FIG. 4B depicts an embodiment of a computer 400 in which the CPU 405 communicates directly with I/O device 435E. FIG. 4B also depicts an embodiment in which local buses and direct communication are mixed: the CPU 405 communicates with I/O device 435D using a local system bus 455 while communicating with I/O device 435E directly.

A wide variety of I/O devices 435 may be present in the computing device 400. Input devices include one or more keyboards 4356, mice, trackpads, trackballs, microphones, and drawing tables, to name a few non-limiting examples. Output devices include video display devices 435A, speakers and printers. An I/O controller 430 as shown in FIG. 4A, may control the one or more I/O devices, such as a keyboard 4356 and a pointing device 435C (e.g., a mouse or optical pen), for example.

Referring again to FIG. 4A, the computing device 400 may support one or more removable media interfaces 420, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 435 may be a bridge between the system bus 455 and a removable media interface 420.

The removable media interface 420 may, for example, be used for installing software and programs. The computing device 400 may further include a storage device 415, such as one or more hard disk drives or hard disk drive arrays, for storing an operating system and other related software, and for storing application software programs. Optionally, a removable media interface 420 may also be used as the storage device. For example, the operating system and the software may be run from a bootable medium, for example, a bootable CD.

In an embodiment, the computing device 400 may include or be connected to multiple display devices 435A, which each may be of the same or different type and/or form. As such, any of the I/O devices 435 and/or the I/O controller 430 may include any type and/or form of suitable hardware, software, or combination of hardware and software to support, enable or provide for the connection to, and use of, multiple display devices 435A by the computing device 400. For example, the computing device 400 may include any type and/or form of video adapter, video card, driver, and/or library to interface, communicate, connect or otherwise use the display devices 435A. In an embodiment, a video adapter may include multiple connectors to interface to multiple display devices 435A. In another embodiment, the computing device 400 may include multiple video adapters, with each video adapter connected to one or more of the display devices 435A. In other embodiments, one or more of the display devices 435A may be provided by one or more other computing devices, connected, for example, to the computing device 400 via a network. These embodiments may include any type of software designed and constructed to use the display device of another computing device as a second display device 435A for the computing device 400. One of ordinary skill in the art will recognize and appreciate the various ways and embodiments that a computing device 400 may be configured to have multiple display devices 435A.

An embodiment of a computing device indicated generally in FIGS. 4A and 4B may operate under the control of an operating system, which controls scheduling of tasks and access to system resources. The computing device 400 may be running any operating system, any embedded operating system, any real-time operating system, any open source operation system, any proprietary operating system, any operating systems for mobile computing devices, or any other operating system capable of running on the computing device and performing the operations described herein.

The computing device 400 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device.

In other embodiments, the computing device 400 is a mobile device. Examples might include a Java-enabled cellular telephone or personal digital assistant (PDA), a smart phone, a digital audio player, or a portable media player. In an embodiment, the computing device 400 includes a combination of devices, such as a mobile phone combined with a digital audio player or portable media player.

A computing device 400 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 400 communicates with other computing devices 400 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for training a confidence model in an automatic speech recognition system to obtain probability of an output hypothesis being correct, comprising the steps of:
providing training examples of audio data, wherein the training examples comprise features and a plurality of multiclass labels that are associated with the features, wherein the plurality of multiclass labels correspond to a degree that the training examples are correctly converted to text;
generating features for training by a decoding module for each audio file in the audio data, wherein the decoding module comprises the confidence model in the automatic speech recognition system;
applying a Deep Neural Network to evaluate the features generated by comparing a hypothesized segment of speech to a known segment of speech, wherein the confidence model provides a probability comprising floating-point numbers of the hypothesized segment of speech being correct to the decoding module; and
labeling comparisons of hypothesized segments to reference segments from one of a plurality of output classes.

2. The method of claim 1, wherein the comparing comprises examining edit distance and normalized edit distance as a metric to determine class label.

3. The method of claim 2, wherein the normalized edit distance is obtained by dividing the edit distance value by the length of the string.

4. The method of claim 1, wherein the plurality of output classes is four.

5. The method of claim 1, wherein the labels comprise one of a plurality of labels corresponding to the degree to which speech is converted to text correctly.

6. The method of claim 1, wherein the training of the confidence model is performed offline using supervised learning.

7. A method for converting input speech to text using confidence modelling with a multiclass approach in an automatic speech recognition system, the method comprising the steps of:
accepting input speech into the automatic speech recognition system;
converting the input speech into a set of features by a frontend module using a speech feature extraction method;
accepting the features by a decoding module and determining a best hypotheses of output text using an acoustic model; and
applying a confidence model trained with a Deep Neural Network to the decoding module to obtain a probability using a multiclass classifier to predict class output text being correct, wherein the confidence model is trained by:
providing training examples of audio data, wherein the training examples comprise features and a plurality of multiclass labels that are associated with the features, wherein the plurality of multiclass labels correspond to a degree that the training examples are correctly converted to text;
generating features for training by a decoding module for each audio file in the audio data, wherein the decoding module comprises the confidence model in the automatic speech recognition system;
evaluating the features generated by comparing a hypothesized segment of speech to a known segment of speech, wherein the confidence model provides a probability comprising floating-point numbers of the hypothesized segment of speech being correct to the decoding module; and
labeling comparisons of hypothesized segments to reference segments from one of a plurality of output classes.

8. The method of claim 7, wherein the speech feature extraction method comprises Mel-frequency Cepstrum Coefficients.

9. The method of claim 7, wherein the comparing comprises examining edit distance and normalized edit distance as a metric to determine class label.

10. The method of claim 9, wherein the normalized edit distance is obtained by dividing the edit distance value by the length of the string.

11. The method of claim 7, wherein the plurality of output classes is four.

12. The method of claim 7, wherein the labels comprise one of a plurality of labels corresponding to the degree to which speech is converted to text correctly.

13. The method of claim 7, wherein the training of the confidence model is performed offline using supervised learning.

\* \* \* \* \*